(12) United States Patent
Samoto et al.

(10) Patent No.: US 11,021,337 B2
(45) Date of Patent: *Jun. 1, 2021

(54) SHEET CONVEYING APPARATUS AND IMAGE RECORDING APPARATUS

(71) Applicant: BROTHER KOGYO KABUSHIKI KAISHA, Nagoya (JP)

(72) Inventors: Kenji Samoto, Nagoya (JP); Masatomo Yamaguchi, Inazawa (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 399 days.

This patent is subject to a terminal disclaimer.

(21) Appl. No.: 16/052,715

(22) Filed: Aug. 2, 2018

(65) Prior Publication Data

US 2019/0031459 A1 Jan. 31, 2019

Related U.S. Application Data

(63) Continuation of application No. 15/417,045, filed on Jan. 26, 2017, now Pat. No. 10,040,653.

(30) Foreign Application Priority Data

Jan. 29, 2016 (JP) .................................. 2016-016742

(51) Int. Cl.
*B65H 3/68* (2006.01)
*B65H 3/44* (2006.01)
(Continued)

(52) U.S. Cl.
CPC ................. *B65H 3/68* (2013.01); *B65H 1/04* (2013.01); *B65H 1/266* (2013.01); *B65H 1/28* (2013.01);
(Continued)

(58) Field of Classification Search
CPC ............ B65H 2404/50; B65H 2404/54; B65H 2404/6111; B65H 2404/612;
(Continued)

(56) References Cited

U.S. PATENT DOCUMENTS 4,958,822 A 9/1990 Rutishauser
4,966,356 A * 10/1990 Ohyabu et al. .......... B65H 3/44
271/9

(Continued)

FOREIGN PATENT DOCUMENTS

CN 101863390 A 10/2010
JP 2002-87621 A 3/2002
JP 2010-222106 A 10/2010

OTHER PUBLICATIONS

Notification of First Office Action issued in related Chinese Patent Application No. 201710061435.0, dated Jun. 3, 2019.
(Continued)

*Primary Examiner* — Patrick Cicchino
(74) *Attorney, Agent, or Firm* — Merchant & Gould P.C.

(57) ABSTRACT

A sheet conveying apparatus includes: a casing provided with a first conveying path and a second conveying path; a first feeding tray provided in the casing and having a first supporting surface that supports a sheet; a supporting member that supports the first feeding tray from below in the casing; a first feeding section provided above the first supporting surface; a first guide member having a first guide surface to guide the sheet fed from the first feeding tray; a second feeding tray provided below the supporting member in the casing and having a second supporting surface that supports a different sheet; a second feeding section provided above the second supporting surface; a second guide member having a second guide surface to guide the different sheet fed from the second feeding tray; and a frame made of metal (Continued)

and being installed on a lower surface of the supporting member.

9 Claims, 8 Drawing Sheets

(51) Int. Cl.
*B65H 1/26* (2006.01)
*B65H 1/04* (2006.01)
*B65H 1/28* (2006.01)
*B65H 3/06* (2006.01)
*B65H 5/06* (2006.01)
*H04N 1/00* (2006.01)

(52) U.S. Cl.
CPC .............. *B65H 3/0684* (2013.01); *B65H 3/44* (2013.01); *B65H 5/06* (2013.01); *H04N 1/0032* (2013.01); *H04N 1/00602* (2013.01); *H04N 1/00604* (2013.01); *H04N 1/00615* (2013.01); *B65H 2401/15* (2013.01); *B65H 2405/1136* (2013.01); *B65H 2405/332* (2013.01); *B65H 2601/24* (2013.01); *B65H 2801/06* (2013.01); *H04N 2201/0094* (2013.01)

(58) Field of Classification Search
CPC .......... B65H 2404/74; B65H 2404/743; B65H 2404/7431; B65H 2405/33; B65H 2405/332; B65H 3/44; B65H 3/446; B65H 3/66; B65H 3/68
See application file for complete search history.

(56) References Cited

U.S. PATENT DOCUMENTS

| | | |
|---|---|---|
| 5,052,670 A | 10/1991 | Makiura |
| 5,678,814 A | 10/1997 | Yokoyama |
| 6,691,998 B2 | 2/2004 | Mori |
| 7,065,318 B2 | 6/2006 | Miki |
| 8,657,278 B2 | 2/2014 | Ozeki |
| 8,870,178 B2 | 10/2014 | Taoka |
| 9,272,546 B2 * | 3/2016 | Kohnotoh ............ B65H 3/0684 |
| 9,764,913 B2 * | 9/2017 | Samoto .................... B65H 3/44 |
| 2010/0244358 A1 | 9/2010 | Okuchi et al. |
| 2017/0123365 A1 * | 5/2017 | Samoto .................... B65H 5/26 |

OTHER PUBLICATIONS

Second Office Action issued in related Chinese Patent Application No. 201710061435.0, dated Feb. 3, 2020.
Office Action (Notice of Reasons for Refusal) issued in related Japanese Patent Application No. 2016-016742, dated Nov. 19, 2019.

* cited by examiner

SHEET CONVEYING APPARATUS AND IMAGE RECORDING APPARATUS

CROSS REFERENCE TO RELATED APPLICATION

The present application is a continuation of U.S. patent application Ser. No. 15/417,045, filed Jan. 26, 2017, which further claims priority from Japanese Patent Application No. 2016-016742, filed on Jan. 29, 2016, the disclosure of both of which is incorporated herein by reference in their entirety.

BACKGROUND

Field of the Invention

The present invention relates to a sheet conveying apparatus that conveys a sheet along a conveying path, and also relates to an image recording apparatus that includes the sheet conveying apparatus and that records an image on the sheet conveyed by the sheet conveying apparatus.

Description of the Related Art

There is known a sheet conveying apparatus having a conveying path along which a sheet is conveyed inside a casing. The sheet conveying apparatus is adopted in an image recording apparatus such as a printer or a multi-function peripheral. In the image recording apparatus having the sheet conveying apparatus, an image is recorded on the sheet conveyed along the conveying path by the sheet conveying apparatus.

Japanese Patent Application Laid-Open No. 2002-87621 discloses an image recording apparatus in which sheet housing bodies are provided in a plurality of tiers. Each of the sheet housing bodies is detachably attachable to an apparatus main body. The apparatus main body is provided with inclined surface members that guide sheets fed from each of the sheet housing bodies. The sheets guided by each of the inclined surface members are conveyed upwardly within a conveying path provided along an up-down direction.

SUMMARY

In the image recording apparatus disclosed in Japanese Patent Application Laid-Open No. 2002-87621, each of the sheet housing bodies is provided with a paper feeding roller for feeding a sheet in each of the sheet housing bodies. That is, an uppermost first sheet housing body is provided with a first paper feeding roller, and a second sheet housing body disposed below the first sheet housing body is provided with a second paper feeding roller. The first paper feeding roller is disposed above the first sheet housing body, and the second paper feeding roller is disposed above the second sheet housing body. As a result, for example, the second paper feeding roller is supported by a frame portion by which the first sheet housing body is supported.

In such a configuration, when a sheet in the first sheet housing body is fed by the first paper feeding roller, a pressing force due to the first paper feeding roller is applied to the frame portion, that supports the first sheet housing body from below. Therefore, the frame portion requires not only a strength to be able to support the second paper feeding roller below, but also, requires a strength not to be deformed, in order to prevent paper feeding performance from becoming unstable by deformation due to the pressing force applied from the first paper feeding roller disposed above.

If the above-described frame portion is thickened, strength of the frame portion increases. However, if the frame portion is thickened, the conveying path of the sheet along the up-down direction becomes longer and the apparatus increases in size.

If a conveying distance of the sheet in the conveying path lengthens, a time taken for conveyance of the sheet lengthens. As a result, work efficiency of image recording processing in the image recording apparatus lowers. In contrast, if conveying speed of the sheet is increased in order to reduce the time taken for conveyance of the sheet, there is a risk of a large noise occurring.

The present teaching was made in view of the above-described problems, and has an object of providing a sheet conveying apparatus that, in a configuration having a plurality of trays on which sheets are supported, can prevent the conveying path of the sheet from becoming longer and prevent the apparatus from increasing in size.

According to a first aspect of the present teaching, there is provided a sheet conveying apparatus, including:
a casing provided with a first conveying path and a second conveying path therein;
a first feeding tray provided in the casing, the first feeding tray having a first supporting surface that supports a sheet;
a supporting member that supports the first feeding tray from below in the casing;
a first feeding section provided above the first supporting surface of the first feeding tray in the casing, the first feeding section feeding the sheet supported by the first supporting surface in a first direction at a feeding position;
a first guide member having a first guide surface, the first guide surface contacting a leading edge of the sheet fed from the first feeding tray to guide the sheet to the first conveying path;
a second feeding tray provided below the supporting member in the casing, the second feeding tray having a second supporting surface that supports a different sheet;
a second feeding section provided above the second supporting surface of the second feeding tray in the casing, the second feeding section feeding the different sheet supported by the second supporting surface in the first direction;
a second guide member having a second guide surface, the second guide surface contacting a leading edge of the different sheet fed from the second feeding tray to guide the different sheet to the second conveying path; and
a frame made of metal, the frame being installed on a lower surface of the supporting member,
wherein the supporting member is provided with a guide section, at a position separated from the first guide surface in the first direction, supporting the first guide member and having a third guide surface that defines at least a part of the second conveying path, and
the frame has a first frame section provided at a position corresponding to the feeding position of the first feeding section in the first direction, and a second frame section provided at a position separated in the first direction from a lower end of the third guide surface.

According to the first aspect of the present teaching, the supporting member in the casing is applied with pressing force from the first feeding section, at the position corresponding to the feeding position of the sheet by the first feeding section. Because there is the first frame section of the frame made of metal at the position where the pressing force is applied, the supporting member is reinforced by the first frame section. As a result, the supporting member need not be thickened. Moreover, since the guide section provided in the supporting member has a configuration of supporting the first guide member, a load is applied to the guide section of the supporting member when the sheet fed from the first feeding tray abuts on the first guide member. In the sheet conveying apparatus according to the first aspect of the present teaching, since a lower section in the guide section is reinforced by the second frame section, the first guide member is stably supported by the second frame section. As a result of this, the supporting member can be thinned and increase in size of the apparatus is suppressed. Moreover, lengthening of a first conveying path and a second conveying path are also suppressed. Therefore, there is no risk that time taken for conveyance of sheets in each of the first conveying path and the second conveying path lengthens, moreover, there is no risk that a large noise occurs due to conveying speed of the sheet being increased, either.

According to a second aspect of the present teaching, there is provided an image recording apparatus, including: the conveying apparatus according to the first aspect of the present teaching; and a recording section provided in the casing to record images on the sheet conveyed along the first conveying path and the different sheet conveyed along the second conveying path, respectively.

The present teaching makes it possible that, in a configuration having a plurality of trays on which sheets are supported, increase in size of an apparatus is suppressed, and moreover, lengthening of time taken for conveyance of a sheet is also suppressed.

DESCRIPTION OF THE EMBODIMENTS

An embodiment of the present teaching will be described below. Note that the embodiment described below is merely an example of the present teaching, and it goes without saying that the embodiment of the present teaching may be appropriately changed in a range not altering the spirit of the present teaching.

<Overall Configuration of Multi-Function Peripheral>

Figure 1:
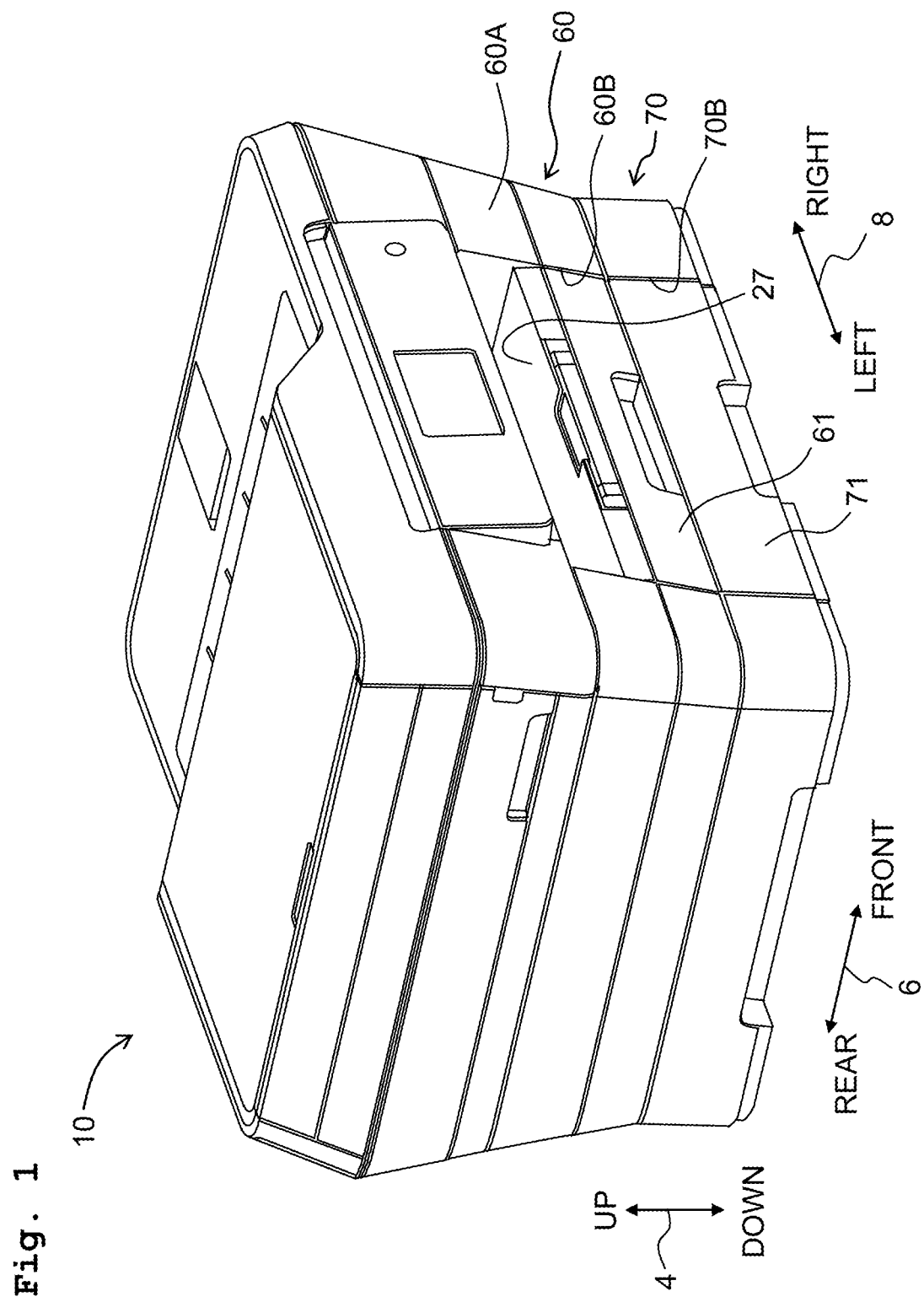
FIG. 1 is a perspective view of a multi-function peripheral.

A multi-function peripheral 10 (an example of an image recording apparatus) depicted in FIG. 1 includes a sheet conveying apparatus, and has various kinds of functions such as a print function, a facsimile function, and a copy function. The print function is a function for recording an image on a recording paper 12 (an example of a "sheet"; refer to FIG. 2).

Note that an up-down direction 4, a front-rear direction 6, and a left-right direction 8 in the multi-function peripheral 10 are respectively defined as depicted in FIG. 1, with reference to a state of FIG. 1 where the multi-function peripheral 10 is usably arranged. The up-down direction 4 corresponds to a direction that a gravitational force acts and to an opposite direction thereto. Moreover, hereafter, the left-right direction 8 will be referred to as a "width direction 8".

As depicted in FIG. 1, the multi-function peripheral 10 is formed roughly into a rectangular parallelepiped shape. The multi-function peripheral 10 includes: a first casing 60 provided internally with a first feeding tray 61; and a second casing 70 provided internally with a second feeding tray 71. Each of the first casing 60 and the second casing 70 has a roughly rectangular parallelepiped shape, and the first casing 60 is installed on the second casing 70. The first casing 60 configures an external appearance of an upper section in the multi-function peripheral 10, and the second casing 70 configures an external appearance of a lower section in the multi-function peripheral 10.

A first opening 60B is formed in a front surface 60A of the first casing 60. The first feeding tray 61 provided within the first casing 60 is withdrawable through the first opening 60B.

A second opening 70B is formed in a front surface of the second casing 70. The second feeding tray 71 provided within the second casing 70 is withdrawable through the second opening 70B.

Figure 2:
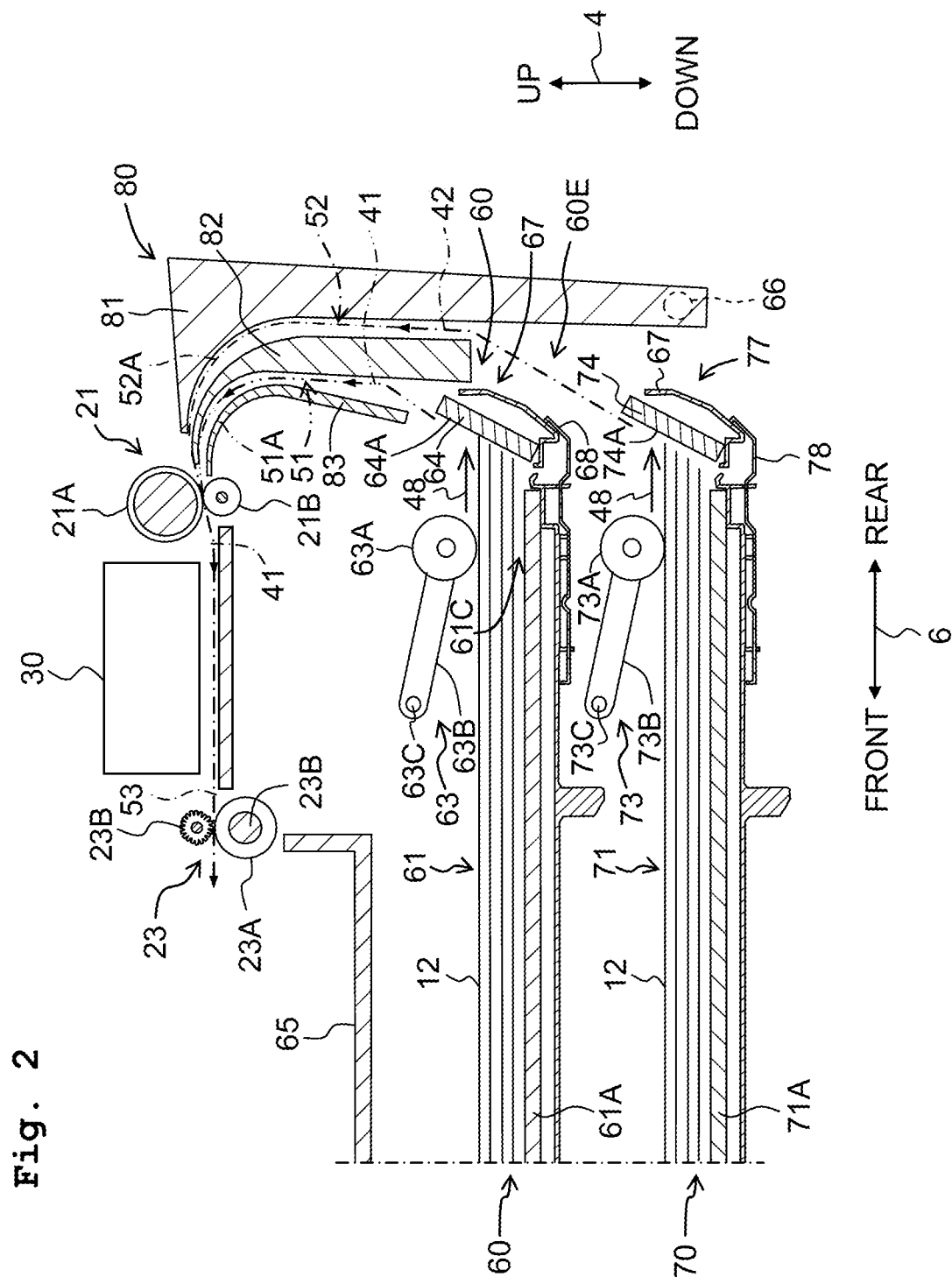
FIG. 2 is a schematic view for explaining a configuration of an inside of the multi-function peripheral.

FIG. 2 is a schematic view depicting a vertical cross section of a rear end in the multi-function peripheral 10. In FIG. 2, configurations of main parts only are depicted schematically, and details of the first casing 60 and the second casing 70 will be mentioned later.

As depicted in FIG. 2, the recording paper 12 is housed in a state of being stacked in the up-down direction 4, in each of insides of the first feeding tray 61 in the first casing 60 and the second feeding tray 71 in the second casing 70. The recording paper 12 in the first feeding tray 61 is supported on a first supporting surface 61A provided in a lower section of the first feeding tray 61. The recording paper 12 in the second feeding tray 71 is supported on a second supporting surface 71A of the second feeding tray 71.

A first feeding section 63 is provided above a rear end in the first feeding tray 61. The first feeding section 63 includes a first feeding roller 63A disposed adjacently to a rear edge of the first casing 60. The first feeding roller 63A is rotatably supported by one end (a distal end) of a first supporting arm 63B, in a state that a rotation axis of the first feeding roller 63A lies along the width direction 8. The other end (a basal end) of the first supporting arm 63B is rotatably supported by a first supporting shaft 63C provided parallel to the rotation axis of the first feeding roller 63A. The first supporting arm 63B is extended out toward the rear from the first supporting shaft 63C.

When the distal end of the first supporting arm 63B is rotated downwardly around the first supporting shaft 63C in a state where the first feeding roller 63A is positioned above the recording paper 12, the first feeding roller 63A contacts the recording paper 12 in an uppermost position housed in the first feeding tray 63. When the first feeding roller 63A is rotated in such a state, the recording paper 12 in the uppermost position contacted by the first feeding roller 63A, of a plurality of the recording papers 12, is fed to the rear. Note that hereafter, a direction in which the recording paper 12 is fed by the first feeding roller 63A will be defined as a "first direction 48".

Note that a position immediately below the first feeding roller 63A in the first supporting surface 61A corresponds to a position that the recording paper 12 in the first feeding tray 61 is fed by the first feeding roller 63A. Because of this, hereafter, a feeding position of the recording paper 12 by the first feeding roller 63A in the first feeding section 63 will be defined as a "feeding position 61C".

Figure 3:
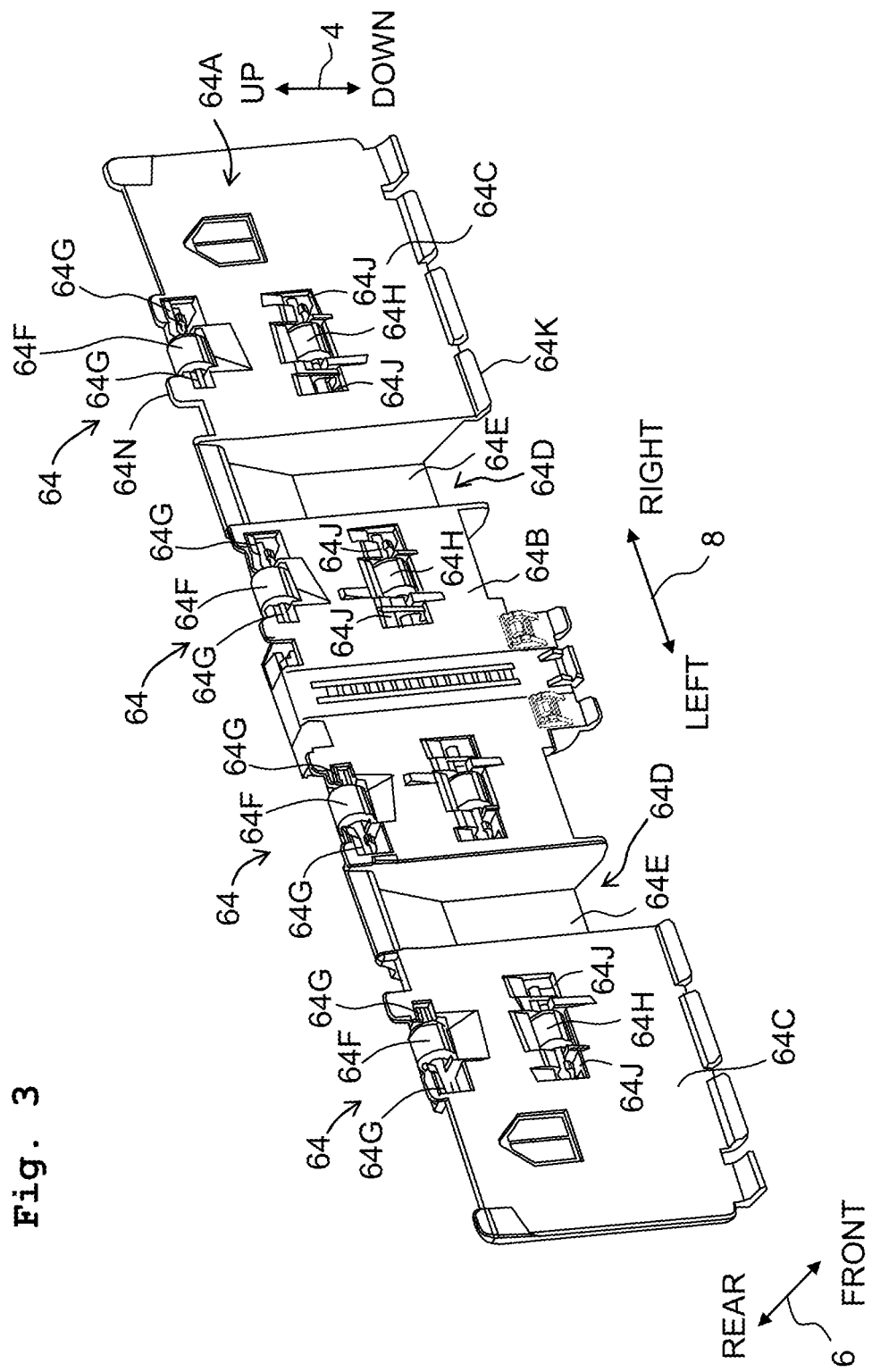
FIG. 3 is a perspective view of a first guide member.

A first guide member 64 is provided at the rear of the first feeding tray 61. As depicted in FIG. 3, the first guide member 64 has a roughly strip-like plate shape, and is disposed over substantially an entire region in the width direction 8 of the first feeding tray 61, along the width direction 8. A front surface of the first guide member 64 is a first guide surface 64A that guides the recording paper 12 fed from the first feeding tray 61 upward and rearward. As will be described later, the first guide member 64 is supported by a supporting member 67 (refer to FIG. 4) of the first casing 60, in a state of the first guide member 64 being inclined such that an upper end 64N of the first guide surface 64A is positioned rearward than a lower end 64K of the first guide surface 64A.

Figure 4:
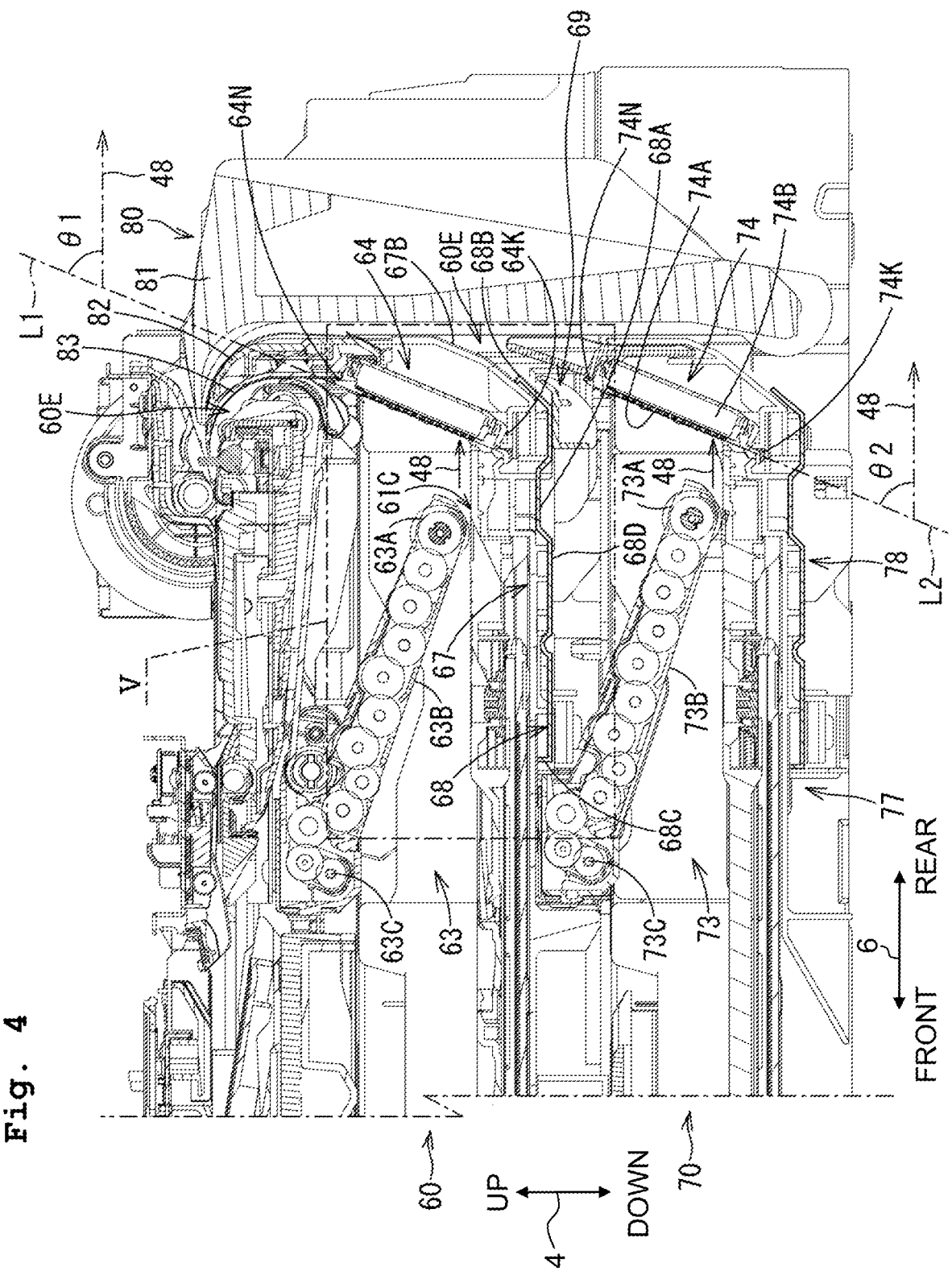
FIG. 4 is a vertical cross-sectional view in a rear section of the multi-function peripheral.

Note that FIG. 4 depicts a "first inclination line L1" lying along an inclination direction of the first guide surface 64A. Moreover, in FIG. 4, an acute angle that the first guide surface 64A makes with the first direction 48 is depicted as an "inclination angle θ1".

As depicted in FIG. 3, the first guide surface 64A includes: a central guide surface 64B provided in a central portion in the width direction 8; and end guide surfaces 64C disposed respectively to the left and right of the central guide surface 64B. Groove sections 64D receding to the rear along the inclination direction of the first guide surface 64A are provided respectively between the central guide surface 64B and each of the end guide surfaces 64C on the left and right. A bottom surface 64E in each of the groove sections 64D is parallel to the first guide surface 64A excluding an upper section.

Four upper rollers 64F are provided at an upper end of the first guide member 64. Two of the four upper rollers 64F are disposed respectively to the left and right with respect to a central portion in the width direction 8 of the central guide surface 64B. The other two of the upper rollers 64F are provided at upper ends of the end guide surfaces 64C respectively. Rotating shafts 64G of each of the upper rollers 64F are rotatably supported by the first guide surface 64A in a state that the rotating shafts 64G lie along the width direction 8.

Four central rollers 64H are provided at a middle in the up-down direction 4 in the first guide member 64. The central rollers 64H are respectively disposed below the four upper rollers 64F. Rotating shafts 64J of the central rollers 64H are also rotatably supported by the first guide surface 64A in a state that the rotating shafts 64J lie along the width direction 8.

The recording paper 12 fed by the first feeding section 63 is guided upwardly along the first guide surface 64A of the first guide member 64. The central rollers 64H and the upper rollers 64F rotate by being contacted by the recording paper 12 guided along the first guide surface 64A. As a result, the recording paper 12 is guided upwardly in a stable manner along the first guide surface 64A, without a large frictional force acting between the recording paper 12 and the first guide surface 64A.

As depicted in FIG. 2, a first conveying path 51 along which the recording paper 12 guided by the first guide member 64 is conveyed, is provided above the first guide member 64. The first conveying path 51 extends upwardly from the first guide member 64, and, furthermore, curves so as to project rearwards. A curved portion in an upper section of the first conveying path 51 will be referred to as a first curved path 51A. The recording paper 12 guided by the first guide member 64 is conveyed upwardly in a lower section of the first conveying path 51, and is then conveyed forward in the first curved path 51A. Note that a conveying direction of the recording paper 12 in the first conveying path 51 will be defined as a "conveying direction 41".

As depicted in FIG. 2, a second feeding section 73 is provided on the second feeding tray 71. The second feeding section 73 has a similar configuration to the first feeding section 63. The second feeding section 73 is positioned below the first feeding section 63. That is, the second feeding section 73 includes a second feeding roller 73A and a second supporting arm 73B, and the second supporting arm 73B is rotatably supported by a second supporting shaft 73C. The second supporting arm 73B is extended rearward and downward from the second supporting shaft 73C.

A second guide member 74 is provided at the rear of the second feeding tray 71. The second guide member 74, similarly to the first guide member 64, includes a second guide surface 74A directed frontwards and guides upwardly the recording paper 12 fed in the first direction 48 by the second feeding section 73. The second guide member 74 has a similar configuration to the first guide member 64.

As depicted in FIG. 4, the second guide member 74 is supported by the second casing 70 in a state of the second guide member 74 being inclined such that an upper end 74N of the second guide surface 74A is positioned rearward than a lower end 74K of the second guide surface 74A. Note that FIG. 4 depicts a "second inclination line L2" lying along an inclination direction of the second guide surface 74A. Moreover, in FIG. 4, an acute angle that the second guide surface 74A makes with the first direction 48 is depicted as an "inclination angle θ2". The inclination angle θ1 of the first guide surface 64A and the inclination angle θ2 of the second guide surface 74A are equal. A lower end 64K of the first guide surface 64A and a lower end 74K of the second guide surface 74A are in substantially the same position in the front-rear direction 6, and an upper end 64N of the first guide surface 64A and an upper end 74N of the second guide surface 74A are in substantially the same position in the front-rear direction 6.

As depicted in FIG. 2, a second conveying path 52 along which the recording paper 12 fed by the second feeding section 73 is conveyed, is provided above a rear end of the second feeding tray 71. The second conveying path 52 is positioned to the rear of the first conveying path 51, that is, on the outside of a curve of the first conveying path 51. An upper end of the second conveying path 52 is a second curved path 52A that is curved so as to project rearwards. A downstream end in a conveying direction 42 of the second curved path 52A is connected to the first conveying path 51 at downstream in the conveying direction 41 in the first curved path 51A of the first conveying path 51. The recording paper 12 guided by the second guide member 74 is conveyed upwardly in a lower section of the second conveying path 52, is then conveyed forward in the second curved path 52A, and is then guided to the first conveying path 51.

A cover member 80 is disposed on a back surface of the multi-function peripheral 10. The cover member 80 opens and closes a back surface opening 60E (refer to FIG. 6) provided in a rear end of the multi-function peripheral. The cover member 80 in an upright position in line with the up-down direction 4 covers the back surface opening 60E. A lower section of the cover member 80 is rotatably supported by a shaft body 66 disposed along the width direction 8. As a result, the cover member 80 has its upper end which is a rotating tip rotated rearward and downward from the upright position in line with the up-down direction 4, and the cover member 80 attains a pulled-down position opening the back surface opening 60E. When the cover member 80 attains the pulled-down position, insides of the first casing 60 and the second casing 70 are exposed to outside via the back surface opening 60E.

The cover member 80 includes a cover main body section 81 which is plate-like and capable of covering the back surface opening 60E. A front surface of that cover main body section 81 defines a rear of the second conveying path 52. A first member 82 and a second member 83 in line with the up-down direction 4 are installed in the cover main body section 81. The first member 82 is disposed in front of the cover main body section 81 while leaving a spacing therebetween. The second member 83 is disposed in front of the first member 82 while leaving a spacing therebetween. A rear surface of the first member 82 defines the front of the second conveying path 52, a front surface of the first member 82 defines the rear of the first conveying path 51, and a rear surface of the second member 83 defines the front of the first conveying path 51. Because the first member 82 and the second member 83 are rotated integrally with the cover main body section 81, a part of the first conveying path 51 and a part of the second conveying path 52 are exposed to outside via the back surface opening 60E when the cover member 80 attains the pulled-down position.

A downstream end in the conveying direction 41 in the first conveying path 51 is continuous with an upper conveying path 53 extending along the front-rear direction 6 in the first casing 60. In the upper conveying path 53, the recording papers 12 conveyed along the first conveying path 51 or the second conveying path 52 are conveyed forward.

A first conveying roller section 21, a platen 22 and a recording section 30, and a second conveying roller section 23 are disposed in the upper conveying path 53, along the conveying direction 41.

The first conveying roller section 21 that conveys forward the recording paper 12 includes: a first conveying roller 21A whose rotation axis is disposed along the width direction 8; and a plurality of pinch rollers 21B disposed below the first conveying roller 21A.

The first conveying roller 21A is disposed capable of contacting a first surface which is an upper surface, of the recording paper 12 that has passed along the first conveying path 51 or the second conveying path 52. The first conveying roller 21A has a length over substantially an entire region in the width direction 8 in the upper conveying path 53. The plurality of pinch rollers 21B are provided in a state of each contacting the first conveying roller 21A, with a constant spacing of the plurality of pinch rollers 21B in the width direction 8. When the first conveying roller 21A is rotated, the pinch rollers 21B in contact with the first conveying roller 21A rotate following rotation of the first conveying roller 21A.

When the recording paper 12 is conveyed to the first conveying roller section 21, rotation of the first conveying roller 21A is stopped. In such a state, a leading edge of the recording paper 12 is abutted on a place where the first conveying roller 21A and the pinch rollers 21B are contacting each other. Furthermore, by an end on an upstream side in the conveying direction 41 in the recording paper 12 being conveyed in the conveying direction 41, the recording paper 12 is pressed on the first conveying roller 21A and the pinch rollers 21B. As a result, the leading edge of the recording paper 12 attains a state of being in line with the contact place of the first conveying roller 21A and the pinch rollers 21B, and an oblique state of the recording paper 12 is cured. Then, when the first conveying roller 21A is rotated, the recording paper 12 is nipped by the first conveying roller 21A and the pinch rollers 21B to be conveyed onto the platen 22.

The platen 22 supports the recording paper 12 conveyed by the first conveying roller section 21, from below, in a state of being in line with the front-rear direction 6 and the width direction 8. The recording section 30 records an image on the recording paper 12 supported by the platen 22, by an ink-jet system. When the image is recorded, rotation of the first conveying roller 21 is stopped, whereby the recording paper 12 stops on the platen 22. Then, by the recording section 30 selectively discharging ink onto the stopped recording paper 12, a one-pass portion of the image is recorded on the recording paper 12. Subsequently, when the first conveying roller section 21 is rotated whereby the recording paper 12 is conveyed in the conveying direction 41 to an extent of the next one-pass portion, the first conveying roller section 21 is stopped whereby the recording paper 12 stops. At this time, the recording section 30 is positioned more upstream in the conveying direction 41 than the one-pass portion of the image in the recording paper 12. This is repeated, whereby image recording is performed over the whole of the recording paper 12.

The second conveying roller section 23 conveys forward the recording paper 12 supported by the platen 22. The second conveying roller section 23 is positioned forward than the platen 22. The second conveying roller section 23 includes: a second roller shaft 23B whose rotation axis is disposed along the width direction 8; a plurality of second conveying rollers 23A installed in the second roller shaft 23B; and a plurality of first spur rollers 23C disposed above the second conveying rollers 23A.

When the second roller shaft 23B is rotated, the second conveying rollers 23A rotate integrally with the second roller shaft 23B. The first spur rollers 23C rotate following rotation of the second conveying rollers 23A. When the recording paper 12 on the platen 22 is conveyed between the second conveying rollers 23A and the first spur rollers 23C in a rotating state, the recording paper 12 is nipped by the second conveying rollers 23A and the first spur rollers 23C to be conveyed frontwards.

The first casing 60 is provided with a discharge tray 27 extending forward from below a downstream end of the upper conveying path 53. The discharge tray 27 is positioned above the first feeding tray 61. The recording paper 12 having the image recorded on its first surface passes through the second conveying roller section 23 in the conveying direction 41 to be discharged onto the discharge tray 27. The discharge tray 27 enables a plurality of recording papers 12 to be supported in a stacked state.

<First Casing 60>

Figure 6:
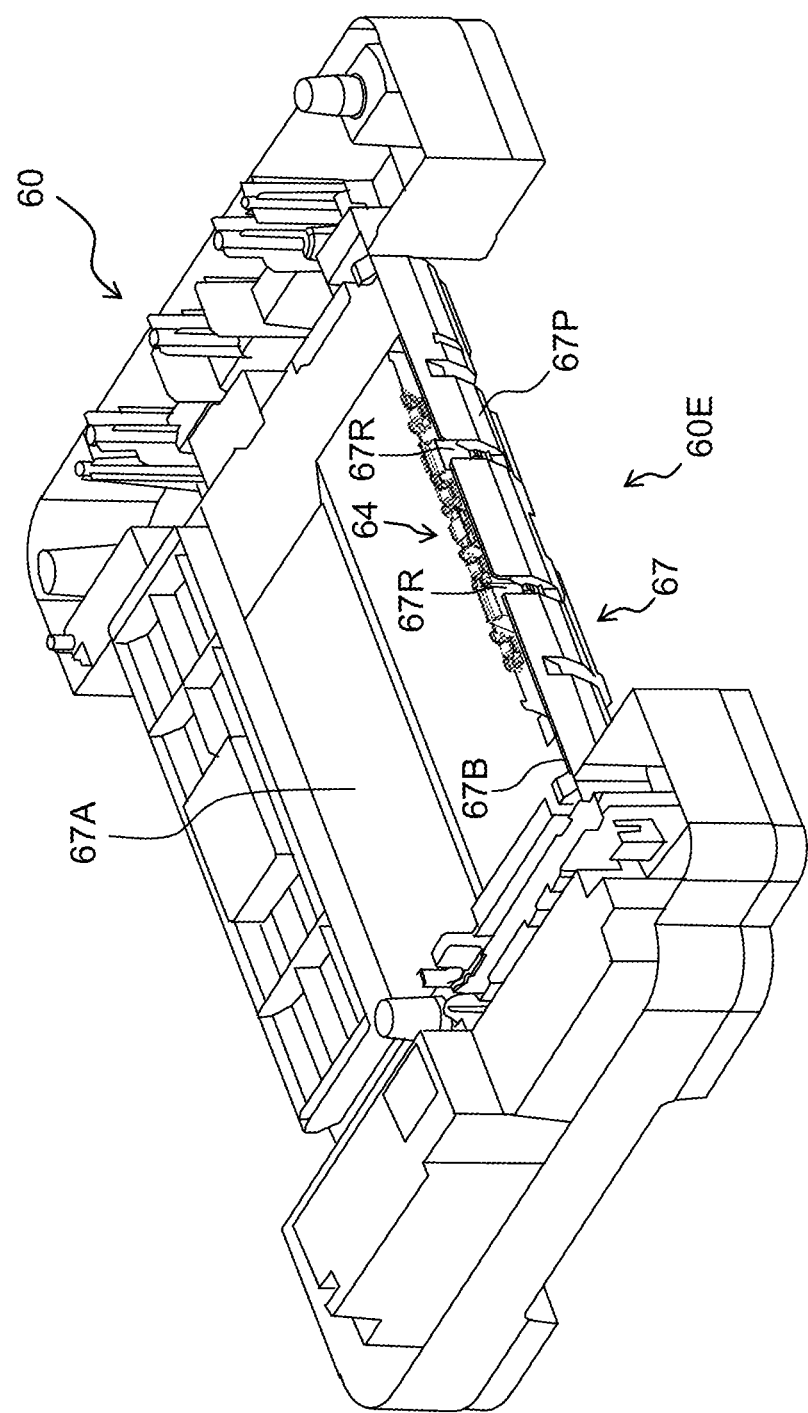
FIG. 6 is a perspective view depicting a first casing that supports the first guide member in a state where a third guide member has been removed.

As depicted in FIG. 6, the first casing 60 includes a supporting member 67 that configures a bottom section of the first casing 60. The supporting member 67 includes: a supporting main body section 67A that supports the whole of the first feeding tray 61 from below; and a guide section 67B provided at an end in the first direction 48 in the supporting main body section 67A. The supporting main body section 67A and the guide section 67B are molded integrally by a synthetic resin.

Figure 5:
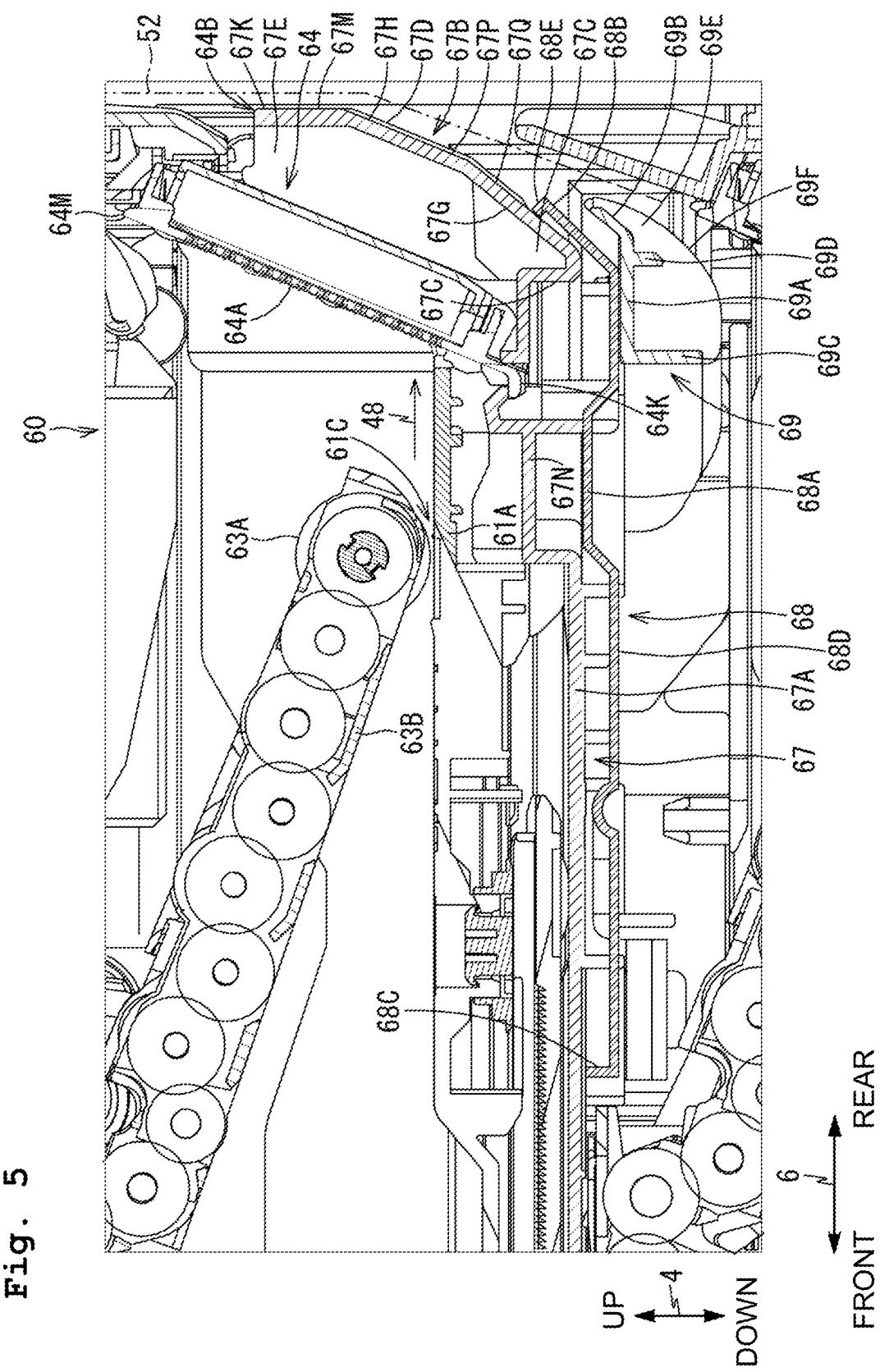
FIG. 5 is an enlarged view of a portion surrounded by a dot-chain line in FIG. 4.

The supporting main body section 67A has roughly a plate shape extending in the front-rear direction 6 and the width direction 8. As depicted in FIG. 5, the guide section 67B is provided continuously with an end 67C (hereafter, defined as "first end 67C") in the first direction 48 in the supporting main body section 67A. As depicted in FIG. 6, the guide section 67B is disposed over an entire region in the width direction 8 of the back surface opening 60E, in a lower section of the back surface opening 60E in the first casing 60.

As depicted in FIG. 5, the first end 67C is disposed below the lower end 64K of the first guide member 64. The first end 67C has a strip-like plate shape in line with the up-down direction 4 and the width direction 8, and its length in line with the up-down direction 4 is shorter compared to its length in line with the width direction 8.

A projection 67N projecting upwardly is provided in the supporting main body section 67A along the width direction 8, from below and rearward in the first direction 48 of the feeding position 61C in the first feeding section 63 to the first end 67C. The projection 67N is disposed over an entire region in the width direction 8 of the back surface opening 60E. An upper surface of the projection 67N is roughly a plane in line with the front-rear direction 6 and the width direction 8, and the lower end 64K of the first guide member 64 is supported by this upper surface.

The first end 67C is extended out downwardly from an end in the first direction 48 in the projection 67N. A lower end of the first end 67C is in substantially the same position in the up-down direction 4 as a plate-like portion excluding the projection 67N in the supporting main body section 67A.

The guide section 67B includes: a first inclined section 67G provided continuously with the lower end of the first end 67C; a second inclined section 67H provided continuously with the first inclined section 67G; and a second end 67K provided continuously with the second inclined section 67H. The second end 67K configures a rear section in the first direction 48 in the supporting member 67.

The first inclined section 67G inclines upward with respect to the first direction 48 from the first end 67C. The second inclined section 67H inclines further upward with respect to the first direction 48 from the first inclined section 67G. Therefore, an inclination angle with respect to the up-down direction 4 of the second inclined section 67H is smaller than an inclination angle with respect to the up-down direction 4 of the first inclined section 67G. The second end 67K is in line with the up-down direction 4.

A back surface 67M of the second end 67K in the guide section 67B defines part of in front of the second conveying path 52. The second inclined section 67H and the first inclined section 67G are positioned upstream in the conveying direction 42 of the second conveying path 52, with respect to the second end 67K. Respective back surfaces 67P and 67Q of the second inclined section 67H and the first inclined section 67G configure a third guide surface 67D that defines part of in front of the second conveying path 52. The third guide surface 67D inclines upward with respect to the first direction 48.

Figure 7:
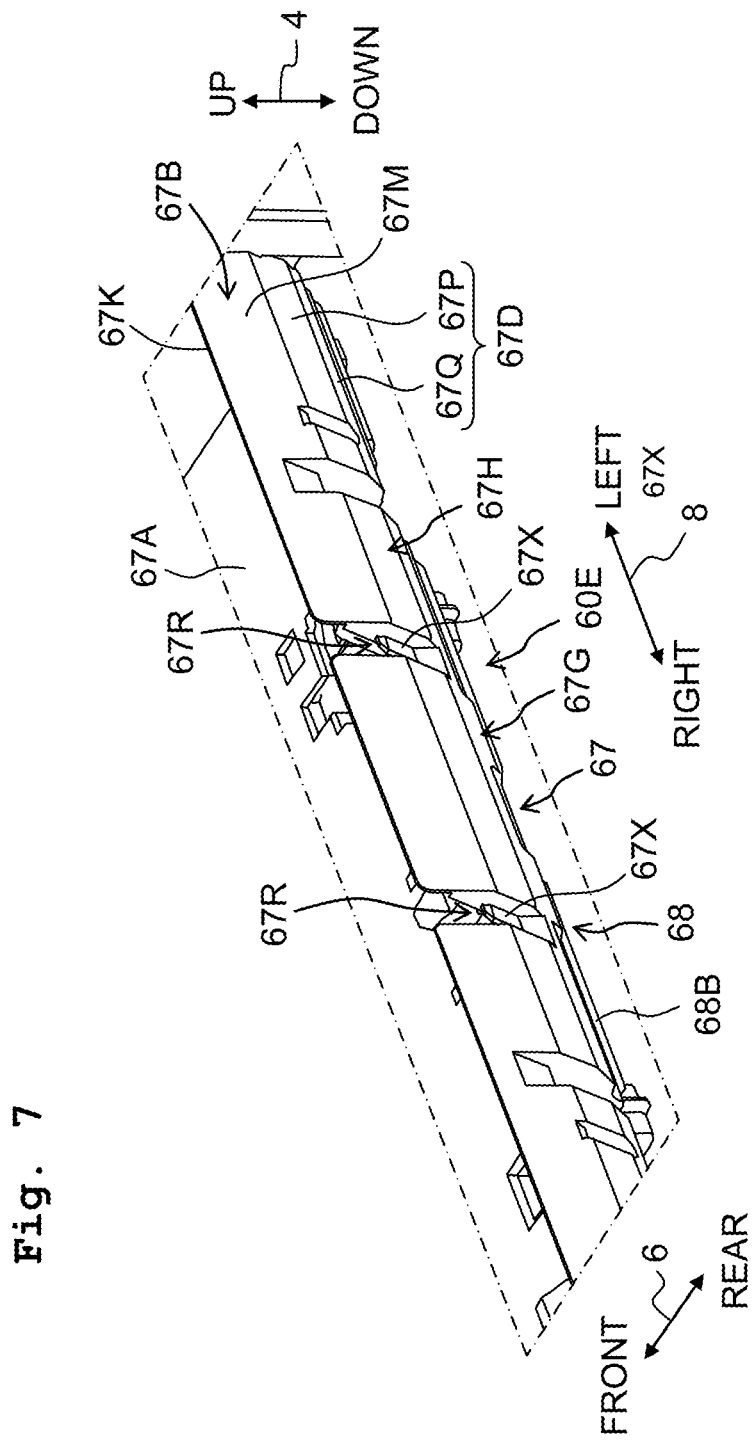
FIG. 7 is an enlarged view of a part of the first casing in a state where the first guide member has been removed.

As depicted in FIG. 7, recesses 67R are respectively provided in the guide section 67B, at positions more central in the width direction 8 than both ends in the width direction 8. Each of the recesses 67R reaches from an upper surface of the guide section 67B to an upper section of the first inclined section 67G, via the second end 67K and the second inclined section 67H.

Figure 8:
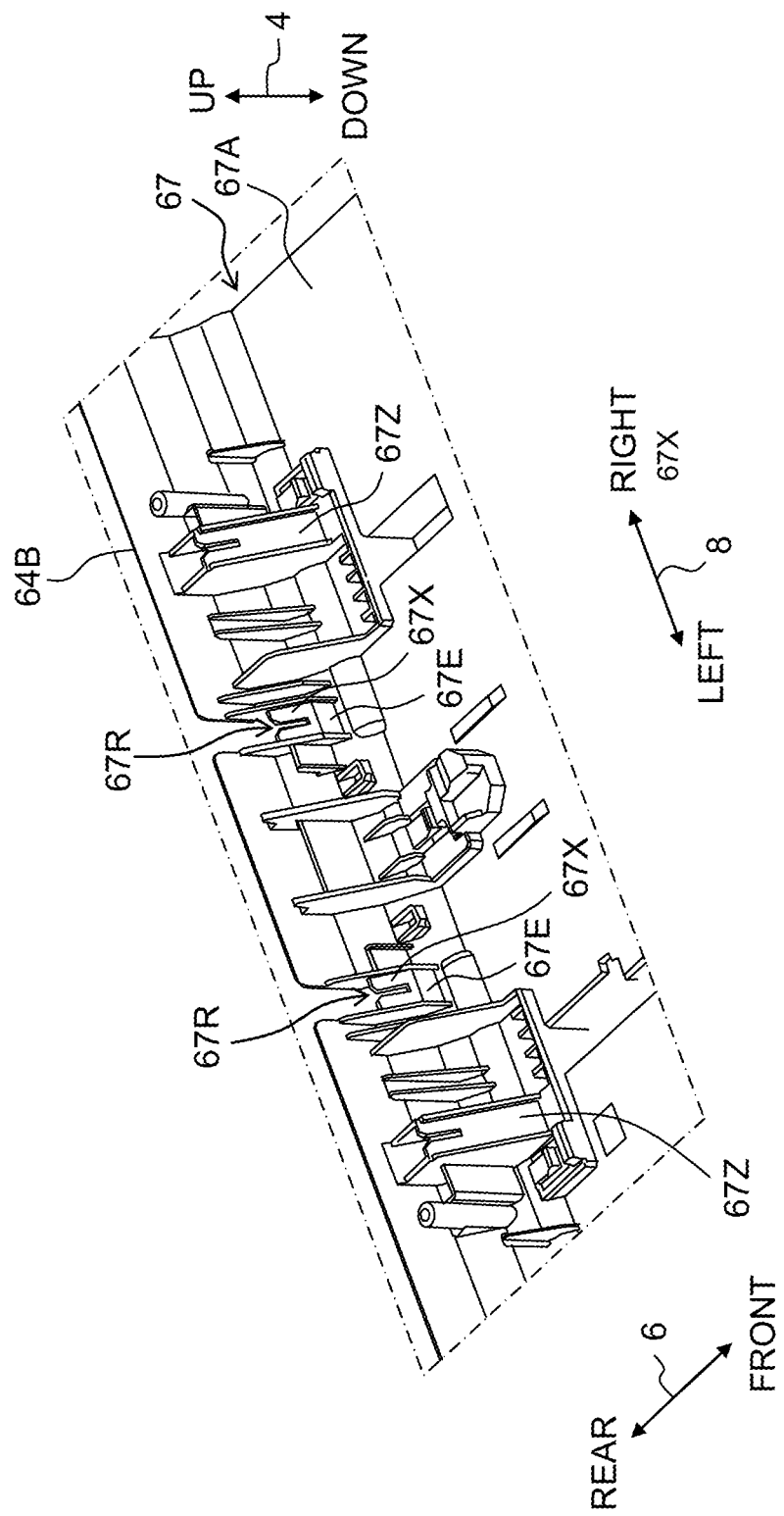
FIG. 8 is a perspective view of a guide section of a supporting member, and a front portion thereof.

As depicted in FIG. 8, a first guide supporting member 67E that supports the first guide member 64 is provided frontwards of each of the recesses 67R. The first guide supporting member 67E projects upwardly from the supporting main body section 67A. An upper section of the first guide supporting member 67E is an inclined section 67X inclined upward and rearward, and the first guide member 64 is supported by the inclined section 67X.

As depicted in FIG. 8, a second guide supporting member 67Z is provided on respective outsides in the width direction 8 with respect to each of the first guide supporting members 67E, in each of the supporting main body sections 67A. The second guide supporting member 67Z is in an inclined state similar to that of the upper section of the first guide supporting member 67E, and a lower end of the second guide supporting member 67Z is positioned on the supporting main body section 67A. The first guide member 64 is supported by an upper section of the second guide supporting member 67Z.

<Frame 68>

As depicted in FIG. 5, a frame 68 made of a metal is installed in the supporting member 67. The frame 68 is manufactured by one metal plate undergoing sheet metal working. The frame 68 includes a frame main body section 68D disposed below a rear end of the supporting main body section 67A in the supporting member 67.

The frame main body section 68D includes a first frame section 68A positioned directly below the feeding position 61C. In addition, the frame 68 includes a second frame section 68B positioned below the guide section 67B in the supporting member 67.

The frame main body section 68D roughly has a plate shape aligned with the supporting main body section 67A in the supporting member 67, and is installed in the supporting main body section 67A by screws (not illustrated). The second frame section 68B is provided continuously in the first direction 48 with the frame main body section 68D, and is disposed over substantially an entire region in the width direction 8 of the back surface opening 60E. The first frame section 68A in line with the width direction 8 is provided in the frame main body section 68D, below the projection 67N provided in the supporting main body section 67A. The first frame section 68A is positioned directly below the feeding position 61C in the first feeding section 63. The first frame section 68A has a position in the up-down direction 4 substantially the same as that of a portion supporting the first feeding tray 61 in the supporting main body section 67A.

The second frame section 68B is provided continuously with the end in the first direction 48 in the frame main body section 68D, and is disposed over substantially an entire region in the width direction 8 in the back surface opening 60E. The second frame section 68B inclines upward with respect to the first direction 48, so as to be in a similar inclined state to the guide section 67B of the supporting member 67. An upper section of the second frame section 68B aligns with the back surface 67Q in the first inclined section 67G of the guide section 67B. A projecting section 68E projecting toward the back surface 67Q of the first inclined section 67G is provided at an upper end of the second frame section 68B, over substantially an entire region in the width direction 8 in the back surface opening 60E. This projecting section 68E contacts a middle in the up-down direction 4 in the back surface 67Q of the first inclined section 67G.

As depicted in FIG. 5, a third frame section 68C in line with the width direction 8 is provided at an opposite end to an end where the second frame section 68B in the frame 68 was provided. The third frame section 68C has a length over an entire region in the width direction 8 in the frame main body section 68D. The third frame section 68C is bent upwardly from an opposite end to the first direction 48 in the frame main body section 68D, and contacts a lower surface of the supporting main body section 67A in the supporting member 67.

As depicted in FIG. 5, a third guide member 69 is installed at an end in the first direction 48 in the frame main body section 68D. Note that the third guide member 69 is not depicted in FIGS. 6 and 7.

The third guide member 69 includes a strip-like plate shaped main body section 69A abutting on a lower surface between the first frame section 68A and the second frame section 68B in the frame main body section 68D. The main body section 69A is provided over substantially an entire region in the width direction 8 in the back surface opening 60E. An inclined section 69B is provided continuously at a side edge in the first direction 48 in the main body section 69A. The inclined section 69B inclines upwardly in the first direction 48. The inclined section 69B is disposed over an entire region in the width direction 8 in the back surface opening 60E. The inclined section 69B is disposed along the second frame section 68B in a state where a spacing is left in the first direction 48.

A wall section 69C extended out downwardly is provided along the width direction 8, at an opposite end to the first direction 48 in the main body section 69A. The wall section 69C and a projecting section 69D also are disposed over an entire region in the width direction 8 in the back surface opening 60E.

A plurality of guide ribs 69E projecting downwardly along the front-rear direction 6 are provided in the third guide member 69. Each of the guide ribs 69E has a plate shape along the front-rear direction 6 and is disposed over substantially an entire region in the width direction 8 of the back surface opening 60E, in a state where a spacing is left between adjacent fellow guide ribs 69E in the width direction 8. Tips 69F of the guide ribs 69E project in a circular arc shape, from an upper end of the inclined section 69B to a lower end of the wall section 69C. The recording paper 12 conveyed along the second conveying path 52 is guided by the tips 69F of the guide ribs 69E to be conveyed to the third guide surface 67D in the supporting member 67.

<Second Casing 70>

As depicted in FIG. 4, the second casing 70 has a roughly similar configuration to the first casing 60, besides not being provided with a member corresponding to the third guide member 69. In the second casing 70, a supporting member 77 and a frame 78 made of a metal are provided below the second feeding tray 71. The supporting member 77 and the frame 78 of the second casing 70 have roughly similar configurations to the supporting member 67 and the frame 68 of the first casing 60.

[Operational Effects of Embodiment]

In the multi-function peripheral 10 of the present embodiment, when the recording paper 12 is fed from the first feeding tray 61, the first feeding roller 63A of the first feeding section 63 is pressed on the uppermost positioned recording paper 12 in the first feeding tray 61. As a result, a pressing force acts on the first supporting surface 61A immediately below the feeding position 61C. As a result, a pressing force acts also on the projection 67N immediately below the feeding position 61C in the supporting member 67.

In the embodiment, because the first frame section 68A of the frame 68 is provided below the projection 67N in the supporting member 67, the supporting member 67 is reinforced by the first frame section 68A. As a result, the projection 67N of the supporting member 67 positioned directly below the feeding position 61C is stably supported. As a result, there is no need to thicken the supporting member 67.

The recording paper 12 fed in the first direction 48 by the first feeding roller 63A contacts the first guide member 64 to be guided to the first guide surface 64A. Therefore, a pressing force in the first direction 48 due to the recording paper 12 contacting the first guide member 64, is applied to the first guide member 64. Because the first guide member 64 is supported by the guide section 67B of the supporting member 67, a pressing force in the first direction 48 is applied also to the guide section 67B.

In the embodiment, a lower section of the guide section 67B is reinforced by the second frame section 68B, and the first guide member 64 is stably supported by the second frame section 68B. This also results in there being no need to thicken the supporting member 67, because the guide section 67B in the supporting member 67 is reinforced.

Due to the above, increase in size of the apparatus is suppressed. Moreover, because lengthening of the first conveying path 51 and the second conveying path 52 are also suppressed, there is no risk that a conveying time of the recording paper 12 in each of the first conveying path 51 and the second conveying path 52 lengthens. Therefore, there is no need to increase a conveying speed of the recording paper 12, and a large noise that occurring due to the conveying speed increasing is not generated.

The first frame section 68A is provided along the lower surface of the supporting member 67, and the second frame section 68B is provided bent from the end in the first direction 48 of the first frame section 68A. As a result, a portion corresponding to the feeding position 61C in the supporting member 67 and the guide section 67B can be reliably reinforced.

The first guide surface 64A of the first guide member 64, the second guide surface 74A of the second guide member 74, and the third guide surface 67D of the supporting member 67 have inclined surfaces that incline upward with respect to the first direction 48. As a result, extension of the apparatus in the first direction 48 can be suppressed.

Inclination angles which are acute angles made with the first direction 48, of, respectively, the first guide surface 64A of the first guide member 64 and the second guide surface 74A of the second guide member 74, are equal. This also enables extension of the apparatus in the first direction 48 to be suppressed.

An upper end of the first guide member 64 and an upper end of the above-described second guide member 74 are at the same position in the first direction 48. This also enables extension of the apparatus in the first direction 48 to be suppressed.

The second frame section 68B is provided at an end in the first direction 48 in the frame 68, and the frame 68 includes the third frame section 68C positioned at an opposite end to the end where the second frame section 68B in the first frame section 68A is provided. Since the third frame section 68C bends upwardly from the frame main body section 68D, the supporting member 67 is further reinforced. As a result, the supporting member 67 can be further thinned, and increase in size of the apparatus can be further suppressed.

Since the third guide member 69 that guides the recording paper 12 conveyed along the second conveying path 52 is installed in the frame, the recording paper 12 is stably conveyed along the second conveying path 52.

Note that in the above-described embodiment, the feeding position 61C is a position that the recording paper 12 is fed by the first feeding roller 63A of the first feeding section 63 in FIG. 2, that is, a position immediately below the first feeding roller 63A. However, a position along the first direction 48 of the first feeding roller 63A changes according to a rotational state of the first supporting arm 63B. That is, the position along the first direction 48 of the first feeding roller 63A changes according to the number of sheets of the recording paper 12 stacked in the first feeding tray 61. Therefore, the feeding position 61C also changes along the first direction 48. Because of this, the feeding position 61C has a certain length along the first direction 48. Therefore, although it is optimal that the first frame section 68A of the frame 68 is positioned directly below an entire range in which the feeding position 61C changes, it may be provided directly below at least part of that range. Moreover, when the first frame section 68A is provided directly below part of that range, it is preferably in a position where a feeding pressure due to the first feeding roller 63A is most greatly applied as a load to the supporting member 67.

MODIFIED EXAMPLES

The first frame section 68A is not limited to a configuration of being positioned directly below the feeding position 61C in the first feeding section 63, and may be provided at a position shifted in the width direction 8 from the position directly below the feeding position 61C. In this case, even if a pressing force is applied to the position directly below the feeding position 61C in the supporting member 67, the supporting member 67 is reinforced by the first frame section 68A provided at the position shifted in the width direction 8 from the position directly below the feeding position 61C.

In addition, an upper end of the second frame section 68B may be positioned more upwardly than a lower end of the first guide member 64. As a result, extension of the apparatus in the up-down direction 4 is suppressed.

What is claimed is:

1. A sheet conveying apparatus, comprising:
a casing provided with a first conveying path and a second conveying path therein;
a first feeding tray provided in the casing, the first feeding tray having a first supporting surface that supports a sheet, the first supporting surface defining a feeding position;
a supporting member that supports the first feeding tray from below in the casing, the supporting member defining a projection extending upwardly therefrom, wherein the feeding position is directly above the projection;
a first feeding section provided directly above the feeding position of the first supporting surface of the first feeding tray in the casing, the first feeding section feeding the sheet supported by the first supporting surface in a first direction from the feeding position;
a first guide member having a first guide surface, the first guide surface contacting a leading edge of the sheet fed from the first feeding tray to guide the sheet to the first conveying path;
a second feeding tray provided below the supporting member in the casing, the second feeding tray having a second supporting surface that supports a different sheet;
a second feeding section provided above the second supporting surface of the second feeding tray in the casing, the second feeding section feeding the different sheet supported by the second supporting surface in the first direction;
a second guide member having a second guide surface, the second guide surface contacting a leading edge of the different sheet fed from the second feeding tray to guide the different sheet to the second conveying path; and
a frame made of metal, the frame being installed on a lower surface of the supporting member,
wherein the supporting member is provided with a guide section at a position separated from the projection and the first guide surface in the first direction, the guide section supporting the first guide member and having a third guide surface,
the frame has a first frame section projecting upwardly therefrom and provided at a position directly below the projection, and a second frame section provided at a position separated from a lower end of the third guide surface in the first direction, and
at least a part of the first frame section is provided at a position corresponding to a position directly below the feeding position.

2. The sheet conveying apparatus according to claim 1, wherein the first frame section is provided along the lower surface of the supporting member and the second frame section is provided to be bent from an end portion in the first direction of the first frame section.

3. The sheet conveying apparatus according to claim 1, wherein the first guide surface, the second guide surface, and the third guide surface are inclined surfaces each of which inclines such that an upper end thereof is positioned downstream of a lower end thereof in the first direction.

4. The sheet conveying apparatus according to claim 3, wherein an inclination angle of the first guide surface which is an acute angle made with the first direction and an inclination angle of the second guide surface which is an acute angle made with the first direction are equal.

5. The sheet conveying apparatus according to claim 4, wherein the upper end of the first guide surface and the upper end of the second guide surface are in the same position in the first direction.

6. The sheet conveying apparatus according to claim 1, wherein the second frame section is provided at an end portion in the first direction of the frame,
the frame has a third frame section positioned at an end portion of the first frame section opposite to the second frame section in the first direction, and
the third frame section is bent upwardly with respect to the first frame section.

7. The sheet conveying apparatus according to claim 1, wherein an upper end of the second frame section is positioned above a lower end of the first guide member.

8. The sheet conveying apparatus according to claim 1, further comprising a third guide member which is installed in the frame and guides the different sheet conveyed along the second conveying path.

9. An image recording apparatus, comprising:
the conveying apparatus as defined in claim 1; and
a recording section provided in the casing to record images on the sheet conveyed along the first conveying path and the different sheet conveyed along the second conveying path, respectively.

* * * * *